(12) United States Patent
Streett

(10) Patent No.: US 9,396,828 B2
(45) Date of Patent: Jul. 19, 2016

(54) CARBON NANOTUBE COATED STRUCTURE AND ASSOCIATED METHOD OF FABRICATION

(75) Inventor: Andrew R. Streett, San Clemente, CA (US)

(73) Assignee: The Boeing Company, Chicago, IL (US)

( * ) Notice: Subject to any disclaimer, the term of this patent is extended or adjusted under 35 U.S.C. 154(b) by 584 days.

(21) Appl. No.: 12/907,273

(22) Filed: Oct. 19, 2010

(65) Prior Publication Data

US 2012/0090658 A1 Apr. 19, 2012

(51) Int. Cl.
| | | |
|---|---|---|
| *B32B 9/00* | (2006.01) | |
| *H01B 1/04* | (2006.01) | |
| *C01B 31/02* | (2006.01) | |
| *C09D 5/24* | (2006.01) | |
| *C09D 7/12* | (2006.01) | |
| *B64G 1/22* | (2006.01) | |
| *B64G 1/50* | (2006.01) | |
| *C08K 3/04* | (2006.01) | |
| *C08K 7/06* | (2006.01) | |

(52) U.S. Cl.
CPC ........ *H01B 1/04* (2013.01); *B64G 1/226* (2013.01); *B64G 1/50* (2013.01); *C01B 31/022* (2013.01); *C09D 5/24* (2013.01); *C09D 7/1291* (2013.01); *C08K 3/04* (2013.01); *C08K 7/06* (2013.01); *Y10T 428/30* (2015.01)

(58) Field of Classification Search
CPC .. C01B 31/022; C01B 31/293; C01B 2202/00
USPC ............ 252/500; 428/408; 423/448; 977/742
See application file for complete search history.

(56) References Cited

U.S. PATENT DOCUMENTS

| | | |
|---|---|---|
| 5,614,033 A | 3/1997 | Robinson et al. |
| 2003/0164427 A1* | 9/2003 | Glatkowski et al. ...... 244/158 R |
| 2005/0267230 A1* | 12/2005 | Esaki et al. .................... 522/172 |
| 2006/0202168 A1* | 9/2006 | Barrera et al. ................ 252/500 |
| 2007/0104859 A1 | 5/2007 | Featherby et al. |
| 2007/0104959 A1 | 5/2007 | Asano |
| 2008/0143906 A1* | 6/2008 | Allemand et al. ............. 349/43 |
| 2009/0217980 A1 | 9/2009 | Pfeiffer et al. |

(Continued)

FOREIGN PATENT DOCUMENTS

| | | |
|---|---|---|
| DE | 10 2005 010 978 A1 | 9/2006 |
| FR | 2 926 301 A1 | 7/2009 |

(Continued)

OTHER PUBLICATIONS

International Search Report and Written Opinion for Application No. PCT/US2011/049876 dated Nov. 24, 2011.

(Continued)

*Primary Examiner* — Daniel H Miller
(74) *Attorney, Agent, or Firm* — Alston & Bird LLP

(57) ABSTRACT

A coated structure is provided that has a highly concentrated coating of carbon nanotubes so as to provide integrated thermal emissivity, atomic oxygen (AO) shielding and tailorable conductivity to the underlying surface, such as the surface of an aerospace vehicle, a solar array, an aeronautical vehicle or the like. A method of fabricating a coated structure is also provided in which a surface is coated with a coating having a relative high concentration of carbon nanotubes that is configured to provide integrated thermal emissivity, AO shielding and tailorable conductivity to the surface.

15 Claims, 2 Drawing Sheets

(56) References Cited

U.S. PATENT DOCUMENTS

| | | |
|---|---|---|
| 2009/0226673 A1 | 9/2009 | Friedersdorf et al. |
| 2010/0009165 A1 | 1/2010 | Patel et al. |
| 2010/0255303 A1 | 10/2010 | Wardle et al. |
| 2011/0281105 A1 | 11/2011 | Compazzi et al. |

FOREIGN PATENT DOCUMENTS

| | | |
|---|---|---|
| FR | 2 926 302 A1 | 7/2009 |
| WO | WO 03/013199 A2 | 2/2003 |
| WO | WO 2008/057615 A2 | 5/2008 |
| WO | WO 2011/088024 A1 | 7/2011 |

OTHER PUBLICATIONS

DuPont™ Kapton®: Products: Kapton® MTB; [online]; [Retrieved on Oct. 19, 2010]; Retrieved from the Internet <URL:http://www2.dupont.com/Kapton/en_US/products/MTB/index.html; 1 page.

DuPont™ Kapton® polyimide film; Product Information; [online]; [Retrieved on Oct. 19, 2010]; Retrieved from the Internet <URL:http://www2.dupont.com/Kapton/en_US/assets/downloads/pdf/MTB_H-38489-1.pdf; 2 pages.

DuPont™ Material Safety Data Sheet; [online]; [Retrieved on Oct. 19, 2010]; Retrieved from the Internet <URL:http://msds.dupont.com/msds/pdfs/EN/PEN_09004a2f800897ec.pdf; 7 pages.

Eikos, Inc.—Invisicon® Technology; Technology > The Invisicon® Advantage [online]; [Retrieved on Oct. 19, 2010]; Retrieved from the Internet <URL:http://www.eikos.com/invisicon.html; 2 pages.

Eikos, Inc.— Invisicone® Technology; Technology > Conductive Coatings [online]; [Retrieved on Oct. 19, 2010]; Retrieved from the Internet <URL:http://www.eikos.com/conductive-coatings.html; 2 pages.

Eikos, Inc.—Invisicon® Technology; Applications [online]; [Retrieved on Oct. 19, 2010]; Retrieved from the Internet <URL:http://www.eikos.com/applications.html; 2 pages.

Office Action from corresponding European Patent Application No. 11773577.9 dated Apr. 8, 2014.

Office Action from corresponding European Patent Application No. 11773577.9 dated Aug. 28, 2014.

Office Action from corresponding European Patent Application No. 11773577.9 dated Jan. 30, 2014.

Office Action from corresponding European Patent Application No. 11773577.9 dated May 20, 2014.

* cited by examiner

CARBON NANOTUBE COATED STRUCTURE AND ASSOCIATED METHOD OF FABRICATION

FEDERALLY SPONSORED RESEARCH OR DEVELOPMENT

This invention was made with Government support under FA9453-10-C-0206 awarded by AFRL. The government has certain rights in this invention.

TECHNOLOGICAL FIELD

Embodiments of the present disclosure relate generally to coated structures and, more particularly, to structures having a carbon nanotube coating and associated methods of fabrication.

BACKGROUND

Structures may include a coating that is selected based upon the properties provided by the coating to the coated structure. For example, space vehicles may have a carbon loaded polyimide coating, such as Black Kapton®, that provides relatively high emissivity/absorbtivity as well as relatively high conductivity for space environment applications, such as for space vehicles in a low earth orbit (LEO) and/or space vehicles in a geosynchronous earth orbit (GEO). While Black Kapton® may have a conductivity that is somewhat tailorable, it would be desirable in at least some applications for a coating, such as for a space vehicle, to have a conductivity that is even more tailorable than those coatings that are commercially available.

Space vehicles, particularly those in LEO, are also subjected to the impingement of atomic oxygen (AO), which may erode the surface of a space vehicle if the surface is not sufficiently protected. Black Kapton® coatings cannot generally survive AO environments for an extended period since the Black Kapton® coating is eroded by the AO. While thicker coatings may be employed, the increased coating thickness disadvantageously increases the weight of the space vehicle without providing an additional benefit.

In some instances, it would also be desirable to provide an insulative boundary, such as the insulative polyimide surface of a space vehicle, between an electrical connection and the Black Kapton® coating so as to utilize the Black Kapton® coating as a radiator for the thermal loads from the electrical connection. Insulative polyimide may not be effectively bonded to a Black Kapton® coating since the mismatch in the coefficients of thermal expansion will generally cause the polyimide surface to curl.

It would therefore be desirable to provide an improved coating having tailorable conductivity, AO properties and thermal radiative properties. In this regard, it would be desirable to provide an improved coating for aerospace vehicles or aeronautical vehicle as well as other applications desirous of improved radiative properties.

BRIEF SUMMARY

A coated structure is therefore provided according to one embodiment which provides integrated thermal emissivity, atomic oxygen (AO) shielding and tailorable conductivity to the underlying surface, such as the surface of an aerospace vehicle, a solar array, an aeronautical vehicle or the like. A method of fabricating a coated structure is also provided according to another embodiment in which a surface is coated with a coating that is configured to provide integrated thermal emissivity, AO shielding and tailorable conductivity to the surface. As such, the coated structure and associated method of fabrication may be tailored to protect the underlying surface in various environments, including space or other high altitude environments, in which the coated structure is subject to sizable temperature fluctuations as well as the impingement of AO.

In one embodiment, a coated structure is provided that includes a substrate having a surface that is configured to be exposed to temperature fluctuations and a coating comprising at least 10% by volume of carbon nanotubes. In this embodiment, the coating is configured to provide an integrated thermal emissivity, AO shielding and tailorable conductivity to the surface.

The coated structure may be utilized in various applications including in applications in which the surface comprises the surface of at least one of an aerospace vehicle or an aeronautical vehicle that is configured to be exposed to temperature fluctuations between −180° C. and 150° C. and, in one embodiment, to temperature fluctuations between −200° C. and 200° C. In another embodiment, the surface upon which the coating is disposed may be the rear surface of a solar array. Regardless of the application, the coating of one embodiment may be configured to provide a thermal emissivity of at least 0.9. The coating of one embodiment may be configured to provide a conductivity of between 1 Ω/square and 5e10 Ω/square. Further, the coating of one embodiment may be configured to provide AO shielding for at least 30 days in a low earth orbit (LEO).

In accordance with another embodiment, a coated structure is provided that includes a substrate having a surface that is configured to be exposed to temperature fluctuations between −180° C. and 150° C. and, in one embodiment between −200° C. and 200° C. The coated structure of this embodiment also includes a coating having a plurality of carbon nanotubes. The coating is configured to provide a thermal emissivity of at least 0.9, a conductivity of less than 400 Ω/square and shielding from atomic oxygen (AO).

In one embodiment, the surface upon which the coating is disposed is the surface of at least one of an aerospace vehicle or an aeronautical vehicle. In another embodiment, the surface upon which the coating is disposed may be the rear surface of a solar array. In either application, the coating of one embodiment may include at least 10% by volume of carbon nanotubes. The coating of one embodiment may be configured to provide a conductivity between 1 Ω/square and 400 Ω/square. Additionally, the coating may be configured to provide AO shielding for at least 30 days in LEO.

In a further embodiment, a method of fabricating a coated structure is provided that includes providing a substrate having a surface that is configured to be exposed to temperature fluctuations and disposing a coating upon the surface. The coating of this embodiment includes at least 10% by volume of carbon nanotubes. The coating of this embodiment is also configured to provide an integrated thermal emissivity, atomic oxygen (AO) shielding and tailorable conductivity to the surface.

In one embodiment, the provision of the substrate includes the provision of an aerospace vehicle or an aeronautical vehicle that is configured to be exposed to temperature fluctuations between −180° C. and 150° C. In this embodiment, the disposition of the coating upon the surface may include the disposition of the coating upon the surface of at least one aerospace vehicle or aeronautical. In another embodiment, the provision of the substrate may include the provision of a solar array having one or more solar cells on one surface and an opposed rear surface upon which the coating is disposed. Regardless of the application, the coating of one embodiment may be configured to provide a thermal emissivity of at least 0.9. The coating of one embodiment may be configured to provide a conductivity between 1 Ω/square and 5e10 Ω/square. The coating of another embodiment may be configured to provide AO shielding for at least 30 days in LEO.

The features, functions and advantages that have been discussed can be achieved independently in various embodiments of the present disclosure or may be combined in yet other embodiments, further details of which can be seen with reference to the following description and drawings.

BRIEF DESCRIPTION OF THE SEVERAL VIEWS OF THE DRAWINGS

Figure 1:
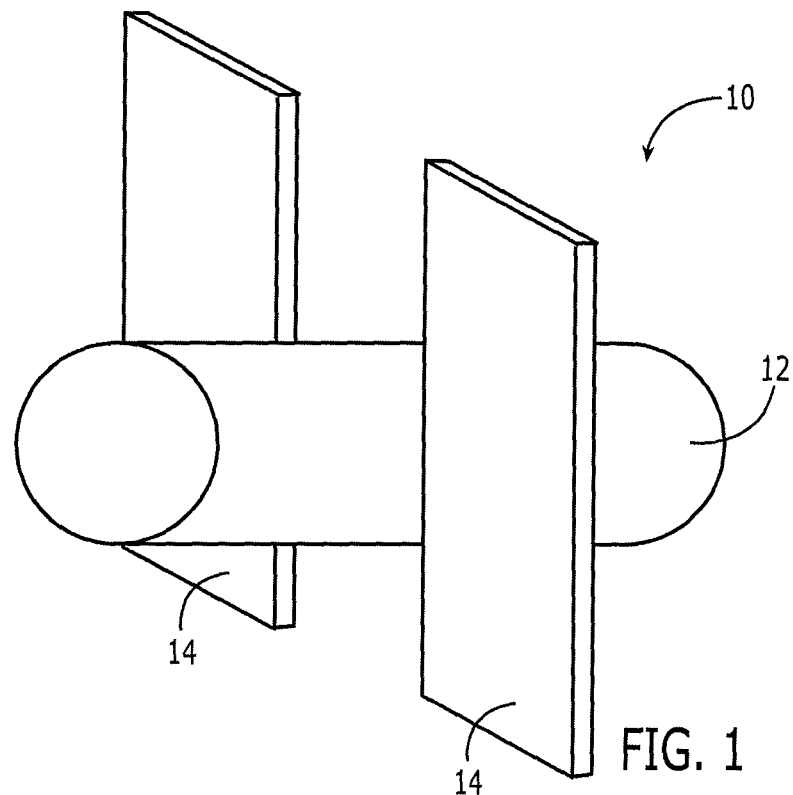
Figure 2:
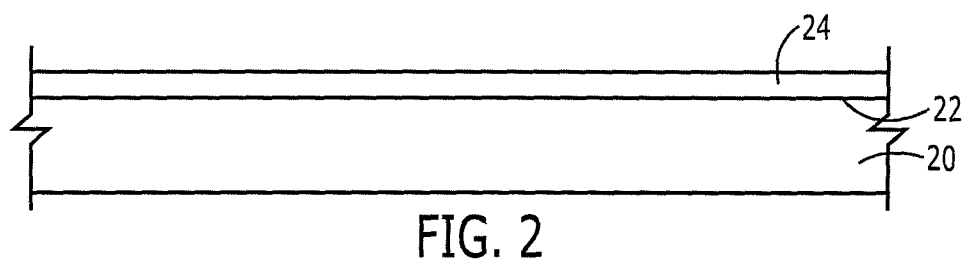
Figure 3:
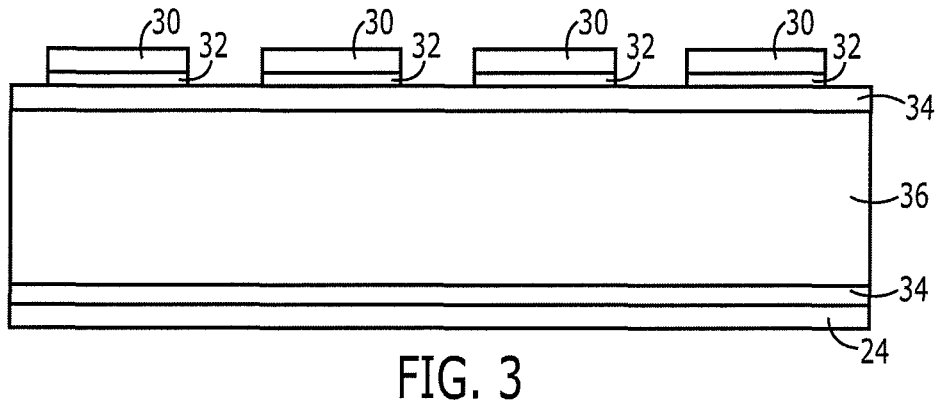
Figure 4:
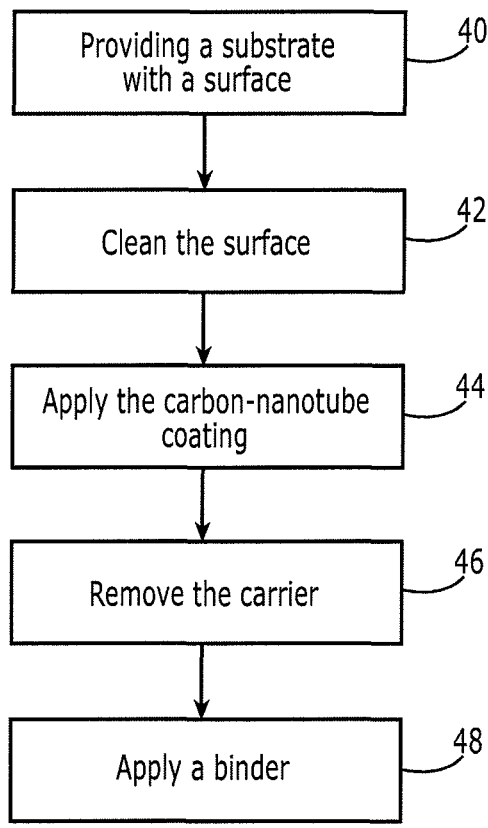

Having thus described the disclosure in general terms, reference will now be made to the accompanying drawings, which are not necessarily drawn to scale, and wherein:

FIG. 1 is a perspective view of an aerospace vehicle and/or aeronautical vehicle embodying a coated structure in accordance with one embodiment of the present disclosure;

FIG. 2 is a cross-sectional view of a portion of the aerospace vehicle of FIG. 1 illustrating the coated structure of one embodiment of the present disclosure;

FIG. 3 is a cross-sectional view of a solar cell array embodying a coated structure in accordance with one embodiment of the present disclosure; and FIG. 4 is a flow chart illustrating operations performed during fabrication of a coated structure in accordance with one embodiment of the present disclosure.

DETAILED DESCRIPTION

The present disclosure now will be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like numbers refer to like elements throughout.

A coated structure is provided in accordance with embodiments of the present disclosure. As a result of the radiative properties of the coating, the coated structure may be deployed in a variety of applications. For example, an aerospace vehicle 10 as shown in FIG. 1 may include a coated structure in accordance with one embodiment. One example of an aerospace vehicle 10 in the form of a satellite having a body 12 and a pair of solar panels 14 is depicted in FIG. 1. However, a wide variety of aerospace vehicles and/or aeronautical vehicles may include a coated structure of embodiments of the present disclosure such that the aerospace vehicle 10 of FIG. 1 should be considered by way of an example, but not by way of limitation. Indeed, while one embodiment of an aerospace vehicle 10 includes a satellite as shown in FIG. 1, other embodiments of aerospace and/or aeronautical vehicles include high altitude air frames, including those intended for flight high in the atmosphere.

As shown in the fragmentary cross-sectional view of FIG. 2, the external surface of the aerospace vehicle 10 or aeronautical vehicle may include a coated structure in accordance with one embodiment of the present disclosure. While the entire external surface of the aerospace vehicle 10 or aeronautical vehicle may be comprised of the coated structure in one embodiment, only portions of the aerospace vehicle or aeronautical vehicle, such as those portions of the aerospace vehicle or aeronautical vehicle that are anticipated to not face the sun or other source of solar energy the coated structure, may be formed of the coated structure in other embodiments. In other words, since the coating is emissive, the coating is typically disposed on those surfaces of aerospace vehicles that face the black of space and/or those surfaces that face away from hot components, such as jet engine thermal energy or sun energy in aeronautical applications. As shown in more detail in FIG. 2, at least that portion of the external surface of the aerospace vehicle 10 or aeronautical vehicle that includes coated structure of embodiments of the present disclosure has a substrate 20 with a surface 22 and a coating 24 disposed upon the surface. For example, the substrate 20 may comprise the air frame, the skin or other structure that defines the external surface of the aerospace vehicle 10 or aeronautical vehicle. The coating 24 may, in turn, be disposed upon the surface 22. While the coating 24 may be disposed directly upon the surface 22, the coating may, instead, be indirectly deposited upon the surface with one or more intermediate layers positioned between the surface and the coating. In either instance, however, the coating is considered to be disposed upon the surface of the substrate. The substrate may be formed of a variety of materials. In one embodiment, however, at least the surface of the substrate is formed of a polyimide.

The coating 24 that is disposed upon the surface 22 may advantageously include a high concentration of carbon nanotubes. For example, the coating 24 of one example embodiment may include at least 10% by volume of carbon nanotubes and, in one embodiment, at least 50% by volume of carbon nanotubes. In one advantageous embodiment, the coating 24 may include at least 80% by volume of carbon nanotubes and, in a further embodiment, may include at least 90% by volume of carbon nanotubes with the remainder of the coating comprised of other elements including, for example, an oxide binder. The coating 24 may include either single-walled carbon nanotubes or multi-walled carbon nanotubes.

As a result of the relatively high concentration of carbon nanotubes within the coating 24, the coating provides a number of advantageous properties to the underlying substrate 20. In this regard, the substrate 20 may be configured to be exposed to temperature fluctuations, such as temperature fluctuations between −180° C. and 150° C. for applications in the GEO and upper LEO. If designed more specifically for GEO applications, the substrate 20 may be configured to be exposed to temperature fluctuations between −200° C. and +60° C. or, more particularly, between −180° C. and +60° C. For upper LEO applications, the substrate 20 may be configured to be exposed to temperature fluctuations between −140° C. and +150° C. Additionally or alternatively, the substrate 20 may be configured to be exposed to temperature fluctuations between −100° C. and +200° C. for lower LEO applications. Thus, the substrate 20 of one embodiment that is designed for upper and lower LEO applications as well as GEO applications may be configured to be exposed to temperature fluctuations between −200° C. and 200° C. Further, a substrate 20 designed for aerospace applications such as a high altitude airship or airplane may be configured to be exposed to temperature fluctuations between −60° C. at relative high speeds through a portion of the atmosphere to +70° C. for engine compartments, for example, that generate substantial internal heat. Correspondingly, the coating 24 having a relatively high concentration of carbon nanotubes advantageously maintains its advantageous properties, such as thermal emissivity, atomic oxygen (AO) shielding and tailorable conductivity, when exposed to these temperature fluctuations, such as between −180° C. and 150° C. and, in one embodiment, to temperature fluctuations between −200° C. and 200° C. as a result of, for example, the relatively low coefficient of thermal expansion (CTE) of the carbon nanotubes and the fact that the carbon nanotubes remain in a solid form throughout the various temperature ranges and do not undergo a phase change. Indeed, the thermal emissivity, AO shielding and conductivity of the coating 24 of one embodiment vary by no more than 5% across any one of these temperature ranges and, in one embodiment, vary by no more than 2.5%. Additionally, the coating 24 having a relatively high concentration of carbon nanotubes may be relatively thin, such as 2 microns or less, such that the coating and the substrate, such as a polyimide substrate, do not separate, such as by curling, when the temperature fluctuations are experienced.

The coating 24 is configured to provide integrated thermal emissivity, atomic oxygen (AO) shielding and tailorable conductivity to the surface 22 of the underlying substrate 20. In this regard, the coating may have a thermal emissivity of at least 0.9 and, in one embodiment, at least 0.95, such as from 0.95 to 1.0. Coatings 24 having such high levels of thermal emissivity are particularly useful for a number of applications including aerospace vehicles 10 or aeronautical vehicles that advantageously have an exterior surface with a relatively high thermal emissivity in order to protect the aerospace vehicle or aeronautical vehicle from overheating and/or heat damage.

The coating 24 also advantageously has a conductivity that is tailorable such that the conductivity of the coating may be modified to most appropriately address the particular application in which the coating is to be deployed. In this regard, the conductivity of the coating 24 may be controllably modified by adjusting the concentration of the carbon nanotubes and/or by utilizing a different type of multi-walled carbon nanotube. The conductivity of the coating 24 may be tailored across a wide range, such as from 1 Ω/square to 5e10 Ω/square. In one embodiment, the conductivity of the coating 24 is tailorable so as to have a value of less than 400 Ω/square, such as to have a conductivity within the range of 220 Ω/square to 400 Ω/square.

The coating 24 also advantageously provides AO shielding for the underlying surface 22. While AO shielding is of importance for a number of different space applications, AO shielding is particularly relevant for aerospace vehicles 10 that are intended to remain in LEO for some period of time since erosion due to AO is particularly problematic for LEO applications. The coating 24 may be tailored to provide different degrees of AO shielding. In this regard, a thinner coating 24 provides some degree of AO shielding, while a thicker coating provides increased amounts of AO shielding. By way of example, a coating 24 having a thickness of about 0.5 microns may provide AO shielding for an aerospace vehicle 10 that is anticipated to remain in LEO for about 30 days, while a coating having a thickness of about 2 microns may provide AO shielding for an aerospace vehicle that is intended to remain in LEO for years.

As noted above, the substrate 20 upon which the coating 24 is disposed is configured to be exposed to a relatively wide range of temperatures. Similarly, the coating 24 is configured to continue to be thermally emissive, to have a tailorable conductivity and to provide AO shielding across the same range of temperatures, such as from −180° C. to 150° C. in one embodiment and from −200° C. to 200° C. in another embodiment. Thus, the effectiveness of the coating 24 in regards to its thermal emissivity, tailorable conductivity and AO shielding is maintained and is not diminished and the coating does not otherwise suffer performance degradation as the temperature fluctuates through these ranges.

The coating 24 may also be advantageously lightweight due to its composition and relative thinness. Consequently, the relatively lightweight coating 24 is advantageous for air, space and other vehicular applications since increases in weight generally add to the operational costs.

As described above, the lightweight coating 24 provides a desirable combination of thermal emissivity, AO shielding, conductivity and resilience to temperature fluctuations so as to protect a variety of aerospace vehicles 10 or aeronautical vehicles. However, the coating 24 may also be advantageously deployed in a number of other applications in which one or more of these properties is desirable. For example, the thermal emissivity of the coating 24 may be advantageously deployed in conjunction with a solar array. As shown in FIG. 3, for example, a solar array may include one or more solar cells 30 comprised of a semiconductor material configured to convert solar energy to electrical energy and a solar panel upon which the solar cells 30 are mounted and carried. In this regard, the solar cells 30 may be mounted to the solar panel with a thermal adhesive 32. Although a solar panel may be constructed in various different manners, the solar panel of one embodiment has a honeycomb core 36 formed, for example, of aluminum with face sheets 34 disposed on opposed sides of the honeycomb core. The face sheets 34 may be formed of various materials including, for example, a composite material formed of carbon fibers and/or Kevlar® fibers embedded in a matrix material. In this embodiment, the coating 24 of highly concentrated carbon nanotubes may be disposed on a surface of the solar panel, e.g., on the rear face sheet 34, opposite the solar cells 30 in order to increase the operational efficiency of the solar array. Alternatively, the solar cells 30 may be mounted on a thin flexible solar array substrate, such as a polyimide substrate, such that the coating 24 is disposed on a rear surface of the substrate opposite the solar cells. In either instance, the coating 24 is disposed on a rear surface of the solar array opposite the solar cells 30.

As described above, the coating 24 is radiative and therefore serves to radiate the solar energy that has passed through the solar array to its rear surface back through the solar array to increase the conversion of solar energy to electrical energy that is affected by the solar cells 30. Solar arrays may be deployed or used in a variety of environments including space environments and other high altitude applications. However, solar arrays may be deployed in other environments if so desired.

The coated structure including the coating 24 of embodiments of the present disclosure may be deployed in a number of other applications in addition to aerospace vehicles 10, aeronautical vehicles and solar arrays in order to advantageously leverage the radiative properties provided by the coating. As such, the foregoing discussion regarding the use of the coated structure in conjunction with aerospace vehicles 10, aeronautical vehicles and solar arrays is provided by way of an example and not as a limitation.

The coating 24 may be applied to the surface 22 of an underlying substrate 20 in various manners. However, one embodiment of a method of fabricating a coated structure is provided below in relation to FIG. 4. In this regard, a substrate 20 having a surface 22 that is configured to be exposed to temperature fluctuations is initially provided as shown in block 40. As described above, the substrate 20 may, for example, be the polyimide exterior surface of an aerospace vehicle 10 or aeronautical vehicle that is configured to be exposed to temperature fluctuation. Alternatively, the substrate 20 may be the rear surface of a solar array formed, for example by a composite face sheet 34. Alternatively, the surface 22 of the substrate 20 may be formed of other materials, such as metals or the like.

Regardless of its composition, the substrate 20 may be cleaned as depicted in block 42 of FIG. 4. Thereafter, the coating 24 having a high concentration of carbon nanotubes may be disposed on the surface 22, such as by being applied to the surface as shown in block 44. In one embodiment, the coating 24 is sprayed onto the surface 22. Regardless of the manner in which the coating 24 is deposited upon the surface 22, the coating includes a relatively high concentration of carbon nanotubes such as at least 10% by volume of carbon nanotubes and, in one embodiment, at least 50% by volume of carbon nanotubes. As noted above, the carbon nanotubes may be deposited upon the surface 22 in one advantageous embodiment such that the coating 24 includes at least 80% by volume of carbon nanotubes and, in a further embodiment, at least 90% by volume of carbon nanotubes. In order to facilitate the application of the coating 24, the carbon nanotubes are generally carried in a carrier or solvent, such as an alcohol solution. Once disposed upon the surface 22, the carrier solvent, such as the alcohol solution, may dissolve or otherwise evaporate, such as in response to the application of heat, as shown in block 46 of FIG. 4. Following the evaporation or dissolution of the carrier or solvent, the carbon nanotubes remain disposed upon the surface 22. A binder may then be applied to the carbon nanotubes in order to further tailor the resulting properties of the coating. See block 48 of FIG. 4. In this regard, the binder may be comprised of an oxide, such as silicon dioxide $SiO_2$ or Indium Tin Oxide (ITO), which is laid in by a variety of techniques including, for example, an ambient technique, such as by spraying As described above, the resulting coating 24 maintains it properties over a wide range of temperatures and has a coefficient of thermal expansion that sufficiently approximates the coefficient of thermal expansion of the underlying substrate 20 such that the coating remains adhered to the surface 22 of the substrate even as the temperature fluctuates through a relatively broad range, such as between −180° C. to 150° C., and, in one embodiment, between −200° C. and 200° C. Additionally, the highly concentrated carbon nanotube coating 24 provides substantial thermal emissivity, tailorable conductivity and AO shielding so as to protect the underlying substrate 20 in a variety of applications, including space applications, such as aerospace vehicles deployed in LEO or GEO. Further, the relatively lightweight nature of the coating 24 facilitates the use of the coating in applications in which it is advantageous to maintain relatively low weights, such as space applications and other vehicular applications.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An external surface of an aerospace vehicle or an aeronautical vehicle, the external surface comprising:
a substrate having a surface that is exposed to temperature fluctuations at least between −180° C. and 150° C.; and
a coating disposed upon the substrate, wherein the coating consists of: (i) a plurality of carbon nanotubes disposed on the surface of the substrate and (ii) a binder that is laid into the carbon nanotubes that are disposed on the surface of the substrate, wherein the binder is formed of silicon dioxide or indium tin oxide that is laid into the carbon nanotubes following disposition of the carbon nanotubes on the surface of the substrate, and wherein the carbon nanotubes comprise at least 50% by volume of the coating, wherein the coating is structured to have a tailorable conductivity up to 5e10 Ω/square while exposed to temperature fluctuations at least between −180° C. and 150° C., wherein the coating is also structured to provide an integrated thermal emissivity to the surface, and wherein the coating has a thickness between 0.5 microns and 2 microns to provide atomic oxygen (AO) shielding.

2. An external surface of an aerospace vehicle or an aeronautical vehicle according to claim 1 wherein the surface is configured to be exposed to temperature fluctuations between −200° C. and 200° C.

3. A coated structure according to claim 1 wherein the surface comprises a rear surface of a solar array.

4. An external surface of an aerospace vehicle or an aeronautical vehicle according to claim 1 wherein the coating is configured to provide a thermal emissivity of at least 0.9.

5. An external surface of an aerospace vehicle or an aeronautical vehicle according to claim 1 wherein the coating is configured to provide a conductivity of between 1 Ω/square and 5e10 Ω/square.

6. An external surface of an aerospace vehicle or an aeronautical vehicle according to claim 1 wherein the coating is configured to provide AO shielding for at least 30 days in a low earth orbit (LEO).

7. An external surface of an aerospace vehicle or an aeronautical vehicle, the external surface comprising:
a substrate having a surface that is configured to be exposed to temperature fluctuations between −180° C. and 150° C.;
a coating disposed upon the substrate, wherein the coating consists of: (i) a plurality of carbon nanotubes disposed on the surface of the substrate and (ii) a binder that is laid into the carbon nanotubes that are disposed on the surface of the substrate, wherein the binder is formed of silicon dioxide or indium tin oxide that is laid into the carbon nanotubes following disposition of the carbon nanotubes on the surface of the substrate, and wherein the carbon nanotubes comprise at least 50% by volume of the coating, wherein the coating is structured to provide a thermal emissivity of at least 0.9, and a tailorable conductivity up to 5e10 Ω/square while exposed to temperature fluctuations at least between −180° C. and 150° C., and wherein the coating has a thickness between 0.5 microns and 2 microns to provide atomic oxygen (AO) shielding.

8. An external surface of an aerospace vehicle or an aeronautical vehicle according to claim 7 wherein the surface of the at least one aerospace vehicle or aeronautical vehicle is configured to be exposed to temperature fluctuations between −200° C. and 200° C.

9. An external surface of an aerospace vehicle or an aeronautical vehicle according to claim 7 wherein the surface comprises at least one of a rear surface of a solar array or an externally facing surface of at least one of an aerospace vehicle or an aeronautical vehicle.

10. An external surface of an aerospace vehicle or an aeronautical vehicle according to claim 7 wherein the coating comprises at least 80% by volume of carbon nanotubes.

11. An external surface of an aerospace vehicle or an aeronautical vehicle according to claim 7 wherein the coating is configured to provide a conductivity of between 1 Ω/square and 400 Ω/square.

12. An external surface of an aerospace vehicle or an aeronautical vehicle according to claim 7 wherein the coating is configured to provide AO shielding for at least 30 days in a low earth orbit (LEO).

13. An external surface of an aerospace vehicle or an aeronautical vehicle according to claim 1 wherein the coating comprises at least 80% by volume of carbon nanotubes.

14. An external surface of an aerospace vehicle or an aeronautical vehicle according to claim 1 wherein the coating comprises at least 90% by volume of carbon nanotubes.

15. An external surface of an aerospace vehicle or an aeronautical vehicle according to claim 7 wherein the coating comprises at least 90% by volume of carbon nanotubes.

* * * * *